(12) United States Patent
Garner et al.

(10) Patent No.: US 9,771,886 B2
(45) Date of Patent: Sep. 26, 2017

(54) METHOD AND SYSTEM FOR DELIVERING A GASEOUS FUEL INTO THE AIR INTAKE SYSTEM OF AN INTERNAL COMBUSTION ENGINE

(71) Applicant: Westport Power Inc., Vancouver (CA)

(72) Inventors: Gage D. Garner, Vancouver (CA); Stephen C. Anderson, North Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 119 days.

(21) Appl. No.: 14/719,650

(22) Filed: May 22, 2015

(65) Prior Publication Data
US 2016/0017835 A1 Jan. 21, 2016

Related U.S. Application Data

(63) Continuation of application No. PCT/CA2013/050890, filed on Nov. 22, 2013.

(51) Int. Cl.
*F02D 41/00* (2006.01)
*F02M 51/04* (2006.01)
(Continued)

(52) U.S. Cl.
CPC ....... *F02D 41/3082* (2013.01); *F02D 19/022* (2013.01); *F02D 19/027* (2013.01);
(Continued)

(58) Field of Classification Search
CPC .. F02D 19/022; F02D 19/027; F02D 41/0027; F02D 41/3082; F02M 21/0221;
(Continued)

(56) References Cited

U.S. PATENT DOCUMENTS

| 4,932,214 A | 6/1990 | Nieratscher et al. |
| 4,947,651 A | 8/1990 | Neeser et al. |

(Continued)

FOREIGN PATENT DOCUMENTS

| EP | 1990272 A1 | 11/2008 |
| FR | 2690223 A1 | 10/1993 |

(Continued)

OTHER PUBLICATIONS

International Search Report of the International Searching Authority issued on Jan. 20, 2014, in connection with International Application No. PCT/CA2013/050890.

(Continued)

*Primary Examiner* — Hieu T Vo
*Assistant Examiner* — Arnold Castro
(74) *Attorney, Agent, or Firm* — Carie C. Mager; C. Larry Kyle

(57) ABSTRACT

A method and system delivers a cryogenically stored fuel in a gaseous state into the air intake system of a gaseous fuelled internal combustion engine. The method involves measuring the pressure in the vapor space of the cryogenic storage vessel, comparing the measured pressure to a required fuel supply pressure and supplying fuel in gaseous state directly from the vapor space of the cryogenic storage vessel to the fuel delivery line that supplies fuel to the engine, when the pressure measured in the vapor space of the cryogenic storage vessel is equal to or higher than the required fuel supply pressure. The method further involves activating a cryogenic pump to deliver fuel to the internal combustion engine from the liquid space of the cryogenic storage vessel when the measured pressure in the vapor space is lower than the required fuel supply pressure.

23 Claims, 6 Drawing Sheets

(51) Int. Cl.
*F02D 41/30* (2006.01)
*F17C 5/00* (2006.01)
*F02M 21/02* (2006.01)
*F02D 19/02* (2006.01)
*F02M 57/04* (2006.01)

(52) U.S. Cl.
CPC ..... *F02D 41/0027* (2013.01); *F02M 21/0221* (2013.01); *F02M 21/0224* (2013.01); *F02M 21/0245* (2013.01); *F02M 21/0287* (2013.01); *F02M 51/04* (2013.01); *F02M 57/04* (2013.01); *F17C 5/007* (2013.01); *F17C 2205/0326* (2013.01); *F17C 2205/0335* (2013.01); *F17C 2221/033* (2013.01); *F17C 2223/0161* (2013.01); *F17C 2223/033* (2013.01); *F17C 2223/043* (2013.01); *F17C 2223/046* (2013.01); *F17C 2225/0123* (2013.01); *F17C 2225/035* (2013.01); *F17C 2227/0142* (2013.01); *F17C 2227/0178* (2013.01); *F17C 2227/0185* (2013.01); *F17C 2227/0309* (2013.01); *F17C 2227/0323* (2013.01); *F17C 2227/0327* (2013.01); *F17C 2227/0393* (2013.01); *F17C 2250/032* (2013.01); *F17C 2250/043* (2013.01); *F17C 2250/0404* (2013.01); *F17C 2250/0439* (2013.01); *F17C 2250/0491* (2013.01); *F17C 2260/046* (2013.01); *F17C 2265/022* (2013.01); *F17C 2265/036* (2013.01); *F17C 2265/066* (2013.01); *F17C 2270/0168* (2013.01); *Y02T 10/32* (2013.01)

(58) Field of Classification Search
CPC .......... F02M 21/0224; F02M 21/0245; F02M 21/0287; F02M 51/04; F02M 57/04; F17C 5/007; F17C 2227/0185; F17C 2227/0309; F17C 2227/0323; F17C 2227/0327; F17C 2227/0393; F17C 2250/032; F17C 2250/0404; F17C 2250/0326; F17C 2250/0439; F17C 2250/0491; F17C 2260/046; F17C 2265/022; F17C 2265/036; F17C 2265/066; F17C 2270/0168; F17C 2205/0335; F17C 2221/033; F17C 2223/0161; F17C 2223/033; F17C 2223/043; F17C 2223/046; F17C 2225/0123; F17C 2225/035; F17C 2227/0142; F17C 2227/0178; F17C 2250/043; Y02T 10/32

See application file for complete search history.

(56) References Cited

U.S. PATENT DOCUMENTS

| | | |
|---|---|---|
| 5,163,409 A | 11/1992 | Gustafson et al. |
| 5,228,295 A | 7/1993 | Gustafson |
| 5,329,908 A | 7/1994 | Tarr et al. |
| 5,421,161 A | 6/1995 | Gustafson |
| 5,566,712 A | 10/1996 | White et al. |
| 5,884,488 A | 3/1999 | Gram et al. |
| 5,937,655 A | 8/1999 | Weiler et al. |
| 6,505,469 B1 | 1/2003 | Drube et al. |
| 6,659,730 B2 | 12/2003 | Gram et al. |
| 6,698,211 B2 | 3/2004 | Gustafson |
| 6,799,429 B2 | 10/2004 | Drube et al. |
| 6,898,940 B2 | 5/2005 | Gram et al. |
| 7,114,342 B2 | 10/2006 | Oldham et al. |
| 7,637,113 B2 | 12/2009 | Batenburg |
| 8,113,006 B2 | 2/2012 | Rech et al. |
| 2002/0189597 A1 | 12/2002 | Bingham et al. |
| 2011/0314839 A1 | 12/2011 | Brook et al. |

FOREIGN PATENT DOCUMENTS

| | | |
|---|---|---|
| WO | 9423201 A1 | 10/1994 |
| WO | 2007031848 A2 | 3/2007 |
| WO | 2010096903 A1 | 9/2010 |
| WO | 2012040835 A1 | 4/2012 |

OTHER PUBLICATIONS

International Preliminary Report on Patentability issued on May 26, 2015, in connection with International Application No. PCT/CA2013/050890.

Canadian Office Action issued on Dec. 3, 2013, in connection with the priority Canadian Patent Application No. 2,796,794.

EPO Extended Search Report issued on Jul. 28, 2016, in connection with counter part application EP Application No. 13857182.3-1603 | 2923062 (EP national stage application of PCT/CA2013/050890).

METHOD AND SYSTEM FOR DELIVERING A GASEOUS FUEL INTO THE AIR INTAKE SYSTEM OF AN INTERNAL COMBUSTION ENGINE

CROSS-REFERENCE TO RELATED APPLICATIONS

This application is a continuation of International Application No. PCT/CA2013/050890 having a filing date of Nov. 22, 2013, entitled "Method and System for Delivering a Gaseous Fuel into the Air Intake System of an Internal Combustion Engine", which claimed priority benefits from Canadian patent application No. 2,796,794 filed on Nov. 23, 2012. The '890 international application is hereby incorporated by reference herein in its entirety.

FIELD OF THE INVENTION

The present disclosure relates to a method and a system for delivering a cryogenically stored fuel to the air intake system of gaseous fuelled internal combustion engine. The method can be used by a fuel storage and delivery system for an internal combustion engine that is fuelled with a gaseous fuel such as natural gas.

BACKGROUND OF THE INVENTION

Natural gas has been used to fuel vehicle engines for many years. The fuel supplied to a natural gas driven vehicle is stored either in a liquefied natural gas (LNG) tank or in a compressed natural gas (CNG) cylinder.

CNG is normally stored at ambient temperatures at pressures up to 3600 pounds per square inch while LNG is normally stored in a cryogenic storage vessel at temperatures between about −240° F. and −175° F. (about −150° C. and −115° C.) and at pressures between 15 and 200 psig. CNG has been the more broadly adopted form of fuel storage but it has a lower energy density compared to LNG. Now that natural gas is gaining greater acceptance as a fuel for transportation, the benefit of the higher energy density for LNG is attractive for vehicles that require a longer range between re-fuelling. LNG provides an energy density of about four times that of CNG with the aforementioned storage conditions. Increased demand for natural gas engines has increased the need to develop improved on-board fuel supply systems with natural gas stored as LNG instead of CNG.

Natural gas fuelled engines can operate by injecting the fuel in the engine's air intake manifold or by injecting the fuel directly into the engine's combustion chambers. In systems where fuel is injected into the engine's air intake system the required fuel supply pressure is relatively low, for example around 100 psig. In systems where the fuel is injected directly into the engine's combustion chamber and where the fuel injection pressure needs to be higher than the in-cylinder pressure the fuel supply system has to deliver natural gas to the injector at higher pressures, for example at pressures of at least 3000 psig.

Current LNG low pressure fuelling systems generally consist of a liquid conduit which supplies liquid fuel from the storage vessel to the engine through a supply line comprising a vaporizer. Fuel is stored in the storage vessel at a pressure of around 150 psi which is higher than the fuel delivery pressure to the engine which can be between 70 to 100 psi.

In these systems, heat is transferred to the LNG fuel storage vessel and a portion of the stored liquid fuel can vaporize thereby increasing the pressure inside the vessel. One method of relieving the pressure inside an LNG storage vessel is to vent the gas into the atmosphere. However this method is wasteful and can be represent a hazard.

As an alternative, the existing delivery systems for low pressure engines are provided with an economizer circuit which consists of a vapor conduit through which vapor can be withdrawn from the vapor headspace in the storage vessel and can be supplied to the engine. In engine supply systems provided with an economizer circuit, most of the time, the engine operates with LNG fuel supplied from the liquid space in the storage vessel and vapor is pulled from the vapor headspace only when the pressure in the storage vessel rises above a predetermined limit set by a regulator placed in the vapour conduit. An example of such a system is described in U.S. Pat. No. 5,421,161 which illustrates an economizer circuit including means for providing a fixed back pressure in the liquid withdrawal conduit such that when the pressure in the storage vessel increases over a predetermined amount, the path of least resistance is through the vapor conduit and vapor is preferentially withdrawn from the vapor headspace of the storage vessel to thereby lower the pressure within the LNG storage tank faster.

The known systems using LNG storage vessels to supply fuel to a low pressure internal combustion engine fuelled with natural gas rely on a high saturation pressure in the storage vessel to push fuel out of the liquid space of the storage vessel and to the engine. When heat is transferred from the surrounding environment to the storage vessel, the saturation pressure of the LNG increases and can be sufficient for pushing fuel out of the vessel. When the engine operates at high load the saturation pressure of the LNG in the storage vessel can drop below a level that is required for pushing fuel out of the tank. As a result the engine becomes starved of fuel and can run in underperforming conditions. In these situations, the driver has to stop the vehicle and wait for the pressure in the storage vessel to increase until he can restart the vehicle.

One known method of increasing the pressure in the LNG storage vessel is to use pressure building coils interposed between the walls of a double-walled cryogenic tank which circulate low temperature fuel from the tank. Heat transferred from to the exterior through the wall of the LNG storage vessel to the pressure building coil vaporizes the liquid fuel and the created vapor can be supplied directly into the headspace of the storage vessel through a regulator when the pressure in the headspace becomes lower than a predetermined value. Such a pressure building circuit is described in U.S. Pat. No. 4,947,651. In other pressure building circuits used for cryogenic tanks in general, such as the one described in U.S. Pat. No. 5,937,655, the pressure building coil is external to the cryogenic tank. In such systems cryogenic liquid from the tank is fed to a pressure builder heat exchanger where the liquid is vaporized and the produced gas is delivered to the tank to pressurize it.

One disadvantage of using pressure building circuits to pressurize a cryogenic fluid storage vessel is that the heat used for generating the vapor that is supplied to the headspace of the storage vessel to pressurize it, is also transferred to the liquid contained in the vessel reducing the vessel's fluid holding time and requiring more frequent venting.

Another disadvantage of the existing low pressure fuel supply systems which rely on the fuel saturation pressure in the storage vessel to supply fuel to the engine is that they cannot adequately supply engines with fuel under transient conditions, when the required fuel supply pressure can vary dynamically between a lower pressure that is required for low load operation and a higher pressure that is required for high load operation. This issue becomes important when natural gas fuel systems are installed on larger vehicles, such as heavy duty trucks, which have larger engines that consume fuel at a higher rate.

Accordingly, there is a need for a method of reliably delivering fuel from a cryogenic storage vessel into the air intake system of a gaseous fuelled internal combustion engine at low pressures, so that fuel is delivered to the engine at the required fuel injection pressure at most, if not all, times and during different engine operating modes including during transients.

SUMMARY OF THE INVENTION

A method is disclosed for delivering a fuel in a gaseous state into the air intake system of a gaseous fuelled internal combustion engine. The method comprises: determining a required fuel supply pressure according to an operating condition of the engine; measuring pressure in a vapor space of a storage vessel which stores the fuel; comparing the measured pressure to the required fuel supply pressure, and supplying fuel in gaseous state to the engine from the vapor space in the storage vessel when the measured pressure is equal to or higher than the required fuel supply pressure, or activating a fuel pump and delivering fuel to the engine from a liquid space in the storage vessel when the measured pressure in the vapor space is lower than the required fuel supply pressure.

The step of determining the required fuel supply pressure comprises determining a required engine intake pressure as a function of engine operating conditions and then adding to it a predetermined pressure threshold. Because the required fuel supply pressure is preferably higher than the engine intake pressure the dynamic engine demands can be met by the system pressure. In some preferred embodiments, the predetermined pressure threshold which is added to the engine intake pressure to determine the required fuel supply pressure is also determined as a function of the engine operating condition. The engine operating condition can be determined from a map stored in the controller's memory that correlates the engine speed with a parameter indicative of the engine condition, for example a parameter indicative of the fuel demand, such as the throttle position.

In some methods, the step of activating the fuel pump comprises supplying hydraulic fluid from a hydraulic pump to a hydraulic drive unit that drives the fuel pump. The hydraulic pump is preferably driven by an electric motor and the electric motor is driven independently from the operation of the internal combustion engine such that the fuel pump can be activated independently of the engine condition.

In some embodiments, at least two hydraulic pumps can supply hydraulic fluid to a hydraulic drive unit that then drives the fuel pump. The present method further comprises electrically activating at least two hydraulic pumps at the same time for delivering hydraulic fluid to the hydraulic drive unit when a commanded hydraulic fluid flow rate is higher than that which can be supplied by only one hydraulic pump.

In preferred embodiments the temperature of the fuel is increased by flowing it through a heat exchanger. The method can comprise increasing the heat exchange rate in the heat exchanger when the fuel is supplied from the liquid space of the fuel storage vessel, compared to when the fuel is supplied from the vapor space of the fuel storage vessel.

In other embodiments the heat exchange rate in the heat exchanger is not controlled by the system controller and is set to be constant.

In some embodiments the fuel delivery system comprises a plurality of storage vessels each having a respective vapor space and a liquid space, and the present method of delivering fuel to the engine further comprises: measuring pressure in the vapor space of each one of the plurality of storage vessels; comparing the measured pressure in the vapor space of each one of the plurality of storage vessels with the required fuel supply pressure; supplying fuel from the vapor space one of the plurality of storage vessels in which vapor pressure is higher than the required system fuel supply pressure; or activating the fuel pump and supplying fuel from one of the plurality of storage vessels when none of the plurality of storage vessels has a vapor pressure higher than the required system fuel supply pressure.

This method which involves supplying fuel from one of the plurality of storage vessels can further comprise measuring the amount of fuel in each of the plurality of storage vessels and, when activating the fuel pump, supplying fuel from one of the plurality of storage vessels that has the largest amount of fuel.

If the fuel delivery system comprises a plurality of storage vessels, each having a respective vapor space and liquid space, and each having a respective fuel pump, the present method can further comprise: measuring pressure in the vapor space of each one of the plurality of storage vessels; comparing the measured pressure in the vapor space of each one of the plurality of storage vessels with the required fuel supply pressure; supplying fuel from the vapor space of one of the plurality of storage vessels in which vapor pressure is higher than the required system fuel supply pressure; or selecting and activating one of the fuel pumps and supplying fuel from an associated one of the plurality of storage vessels when none of the plurality of storage vessels has a vapor pressure higher than the required system fuel supply pressure.

In this method the step of selecting one of the fuel pumps that is to be activated is determined by operating each one of the fuel pumps in sequential order. Alternatively, the step of selecting one of the fuel pumps that is to be activated is determined by measuring the amount of fuel in each one of the plurality of storage vessels and selecting the one of the plurality of fuel pumps that is associated with the storage vessel that has the largest amount of fuel.

In preferred embodiments of the method where fuel is supplied from one of a plurality of fuel storage vessels, the method can further comprise increasing the temperature of the fuel by flowing it through a heat exchanger associated with a respective storage vessel from which fuel is supplied to the engine.

A system is also disclosed for delivering fuel in a gaseous state into the air intake system of a gaseous fuelled internal combustion engine. The system comprises: a storage vessel for holding the fuel; a fuel pump fluidly connected to receive fuel from a liquid space of the storage vessel; a liquid supply line in fluid communication with a discharge outlet of the fuel pump for delivering fuel from the discharge outlet of the fuel pump to a delivery line which delivers fuel to the engine; a vapor supply line in fluid communication with a vapor space of the storage vessel for delivering fuel in a gaseous state from the vapor space to the delivery line; a pressure sensor for measuring vapor pressure in the vapor space of the storage vessel; and a controller which receives pressure measurements from the pressure sensor, determines a required fuel supply pressure according to an operating condition of the engine and compares the measured pressure to the required fuel supply pressure, wherein the controller commands the fuel pump to operate when the measured pressure is lower than the required fuel supply pressure.

The system preferably comprises a heat exchanger placed in the delivery line for increasing the temperature of the fuel being supplied to the engine. The system also comprises a hydraulic pump which supplies hydraulic fluid to a hydraulic drive unit that drives the fuel pump. Preferably, the hydraulic pump is driven by an electric motor which operates independently from the operation of the engine such that the operation of the fuel pump can be controlled independently of the engine operation.

In some embodiments, the system comprises at least two hydraulic pumps which can be electrically activated to deliver hydraulic fluid to the hydraulic drive unit that drives the fuel pump. In some embodiments the fuel pump is disposed within a cryogenic space of the storage vessel.

In some embodiments the system comprises more than one storage vessel. Each storage vessel in the system has a respective vapor space and a liquid space, and is fluidly connected to the fuel pump. In these systems the controller is programmed to activate the fuel pump to supply fuel from the liquid space of one of the plurality of storage vessels when none of the plurality of storage vessels has a vapor pressure higher than the required fuel supply pressure.

In other embodiments, the system comprises more than one storage vessel, each storage vessel having a respective vapor space and liquid space, and each being fluidly connected to a respective fuel pump. In these systems the controller is programmed to select and activate one of the fuel pumps and supply fuel from a storage vessel associated with the selected fuel pump when none of the plurality of storage vessels has a vapor pressure higher than the required fuel supply pressure.

In preferred embodiments the system comprises an engine that is the prime mover for a vehicle.

DETAILED DESCRIPTION OF ILLUSTRATIVE EMBODIMENT(S)

Figure 1:
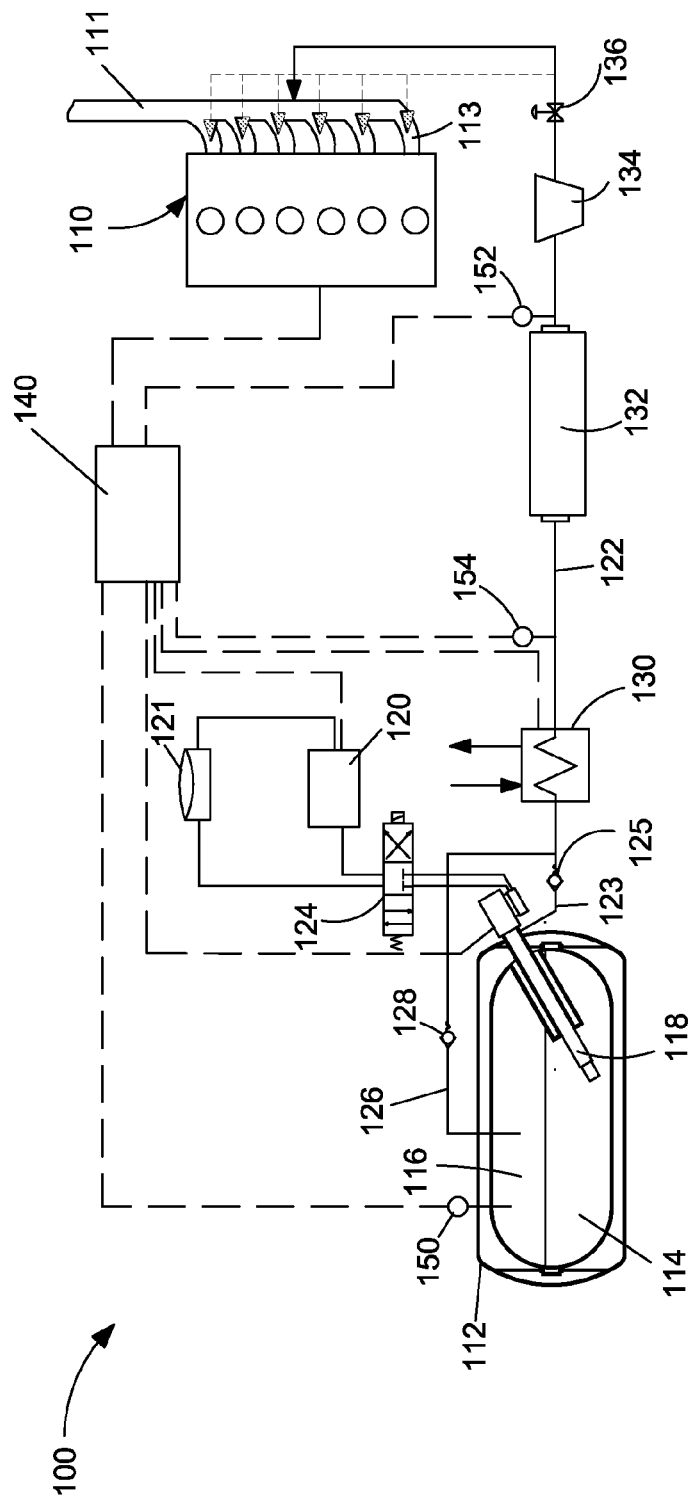
FIG. 1 is schematic diagram of a system for delivering fuel in gaseous state into the air intake system of an internal combustion engine.

FIG. 1, schematically illustrates fuel delivery system 100 which is employed to supply a fuel in gaseous state into the air intake system of an internal combustion engine. Engine 110 is an internal combustion engine which is operated by injecting fuel into the engine's air intake manifold or into the air intake port, which is a different method than injecting fuel directly into the engine's combustion chamber. Gaseous fuel is injected into air intake manifold 111 of engine 110 or into air intake ports 113 at pressures that are generally around 70 to 100 psig (pounds per square inch gauge) and can reach around 500 psig. Such pressures are much lower than the operating pressure of a direct injection internal combustion engine where gaseous fuel is injected directly into the combustion chamber at around 4000 psig.

Fuel delivery system 100 comprises fuel storage vessel 112 which stores gaseous fuel in liquefied form at cryogenic temperatures in liquid space 114 within the cryogenic space of the storage vessel. Since heat is transmitted from the surrounding environment to the walls of the storage vessel, liquid fuel stored in the vessel can vaporize and the generated vapor occupies the headspace of the storage vessel, creating vapor space 116.

Liquid space 114 is fluidly connected to fuel pump 118 which can be placed inside the cryogenic space of the storage vessel, as illustrated in FIG. 1, or can be an external pump that communicates through a supply line with the liquid space in the storage vessel. Fuel pump 118 can be activated by starting hydraulic pump 120 which supplies hydraulic fluid from storage vessel 121 through flow switching device 124 to the hydraulic drive unit of fuel pump 118. Hydraulic pump 120 is driven by an electric motor and therefore can operate independently of the operating condition of the engine. In current fuel delivery systems, the hydraulic pump that activates the fuel pump is mechanically actuated by the engine accessory drive and therefore depends on the engine rotation (rpm).

Liquid fuel from liquid space 114 of fuel storage vessel 112 can be pumped by fuel pump 118 through liquid fuel supply line 123 to delivery line 122 which supplies fuel to engine 110. Liquid fuel supply line 123 comprises check valve 125 which prevents, or at least reduces, fuel backflow to storage vessel 112.

Fuel in vapor form can be supplied from vapor space 116 to delivery line 122 through vapor supply line 126 whose one end fluidly communicates with vapor space 116 of storage vessel 112. Vapor supply line 126 is provided with check valve 128 to prevent, or at least reduce, fuel backflow to storage vessel 112.

Liquid fuel line 123 and vapor supply line 126 are each connected to delivery line 122 downstream of their respective check valve. Delivery line 122 further comprises heat exchanger 130 which transmits heat from a heat exchange fluid to the fuel. In some embodiments the heat exchange fluid in heat exchanger 130 is the engine coolant. Delivery line 122 further comprises module 132 for dampening the pressure fluctuations in the stream of fuel being supplied to the engine and pressure regulator 134 for adjusting the pressure of the fuel supplied to the engine to the required engine intake pressure. Automatic fuel shut-off valve 136 is provided on delivery line 122 between pressure regulator 134 and engine 110. Fuel shut-off valve 136 is used as a safety measure for stopping any, or at least substantially any, fuel flow to the engine when the engine is not operating.

The system further comprises controller 140 which commands the operation of fuel pump 118 and hydraulic pump 120 and receives measurement signals from pressure sensors 150 and 152 and from temperature sensor 154. Pressure sensor 150 measures the pressure in vapor space 116 of fuel storage vessel 112 and pressure sensor 152 measures the fuel supply pressure which is the pressure in fuel delivery line 122 downstream of module 132 and upstream of pressure regulator 134. Temperature sensor 154 measures the temperature of the fuel flowing through delivery line 122 downstream of heat exchanger 130 and controller 140 can control the operation of heat exchanger 130 so that the temperature of the fuel supplied to engine 110 is higher than a predetermined limit.

Controller 140 also receives input from the engine regarding the engine speed and another parameters indicative of the engine operating condition. One of the parameters indicative of the fuel demand is the throttle position. The controller can determine the required fuel supply pressure based on the information from a map, which correlates the engine speed data with the other parameters indicative of the engine operating condition.

Figure 2:
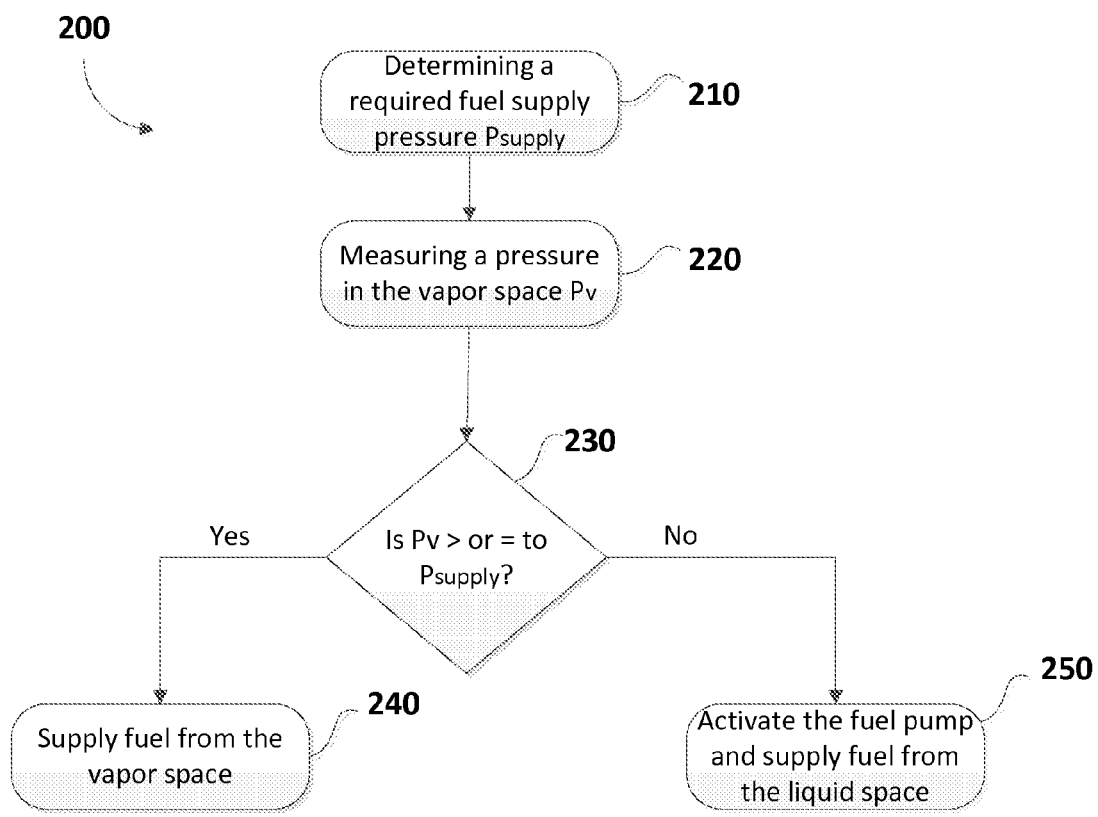
FIG. 2 is a schematic diagram illustrating the basic steps of a method for delivering fuel from a cryogenic storage vessel to the air intake system of a gaseous fuelled internal combustion engine.
Figure 3:
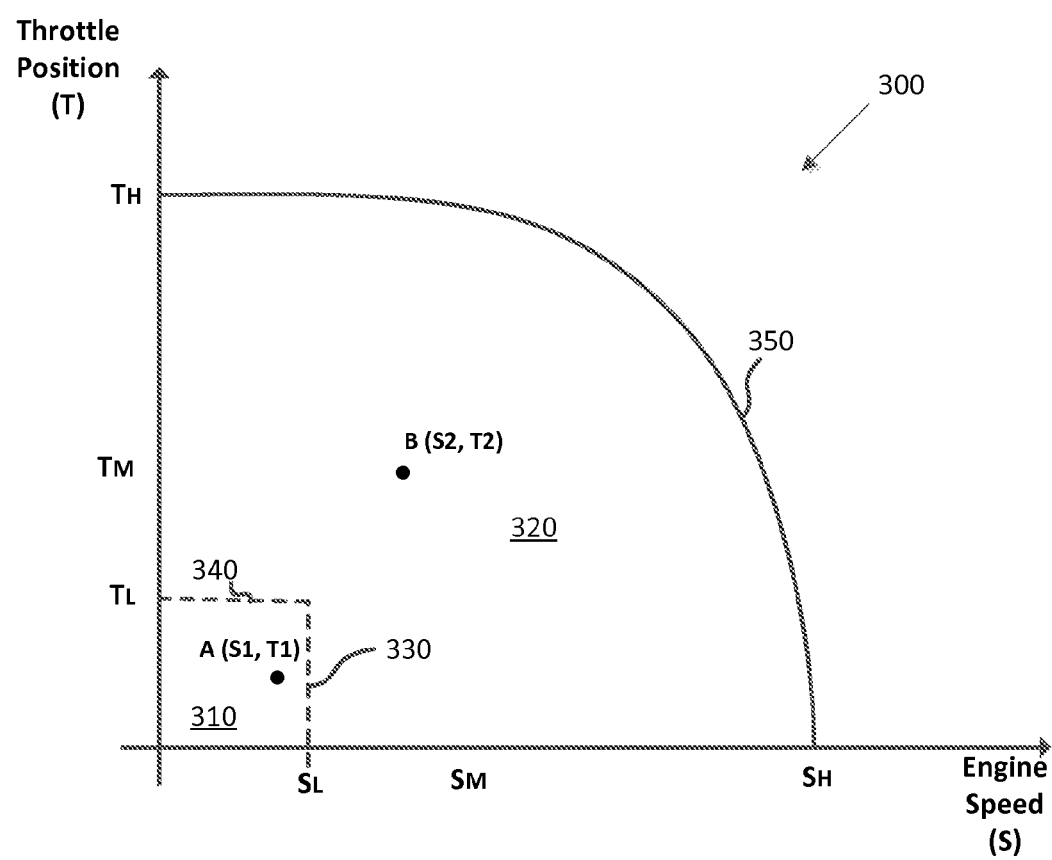
FIG. 3 is a representation of a map correlating the engine speed with the throttle position which is used by the system's controller to determine the engine operating condition.

The method of delivering fuel in a gaseous state into the air intake system of a gaseous fuelled internal combustion engine will now be described in relation to the embodiment of the fuel delivery system illustrated in FIG. 1. The steps of the method are illustrated in FIG. 2. In step 210 of method 200, controller 140 determines the required fuel supply pressure which is the pressure of the fuel flowing through delivery line 122 upstream of pressure regulator 134. At this step, controller 140 receives information from the engine regarding its operating condition and uses the map illustrated in FIG. 3 to determine a point on the map which indicates the current engine operating condition. Map 300 stored in the controller's memory is divided into two regions low flow region 310 and high flow region 320. Low flow region 310 is delimited by boundary line 330 set by a low speed $S_L$ and by boundary line 340 set by a low throttle position $T_L$. High flow region 320 is delimited by boundary line 350 set by a high engine speed $S_H$ and a high throttle position $T_H$. If the engine operates for example at a point A, which is characterized by coordinates $(S_1, T_1)$ corresponding to a value $S_1$ for the engine speed and a value $T_1$ for the throttle position, it is determined that the engine operates in low flow region 310. Once the point on the map where the engine operates is identified, controller 140 can determine based on predetermined algorithms, the engine intake pressure $P_{engine\ A}$ required for operating the engine efficiently. The required fuel supply pressure $P_{supply\ A}$ is then determined by the formula $P_{supply\ A} = P_{engine\ A} + P_{threshold\ A}$, where $P_{threshold\ A}$ is the pressure value that is added to the engine intake pressure to obtain the fuel supply pressure. The fuel supply pressure, which is the pressure in fuel delivery line 122 upstream of pressure regulator 134 is higher than the engine intake pressure which is the pressure in fuel delivery line 122 downstream of pressure regulator 134 such that dynamic engine demands can be easily met. Similarly, if the engine operates at point B characterized by coordinates $(S_2, T_2)$, corresponding to a different engine speed $S_2$ and a different throttle position $T_2$, located in high flow region 320 on map 300, the controller determines that a different engine intake pressure $P_{engine\ B}$ is required for operating the engine efficiently. The required fuel supply pressure is then determined by the same formula: $P_{supply\ B} = P_{engine\ B} + P_{threshold\ B}$. The value of the pressure threshold that is added to the required engine intake pressure when the engine operates in low flow region 310 is different than the pressure threshold that is added to the required engine intake pressure when the engine operates in high flow region 320. Both the engine intake pressure $P_{engine}$ and the threshold pressure $P_{threshold}$ are determined by the controller through control algorithms based on the region on map 300 where the engine operates.

In step 220, pressure $P_v$ within vapor space 116 of fuel storage vessel 112 is measured by pressure sensor 150 and the measured value is communicated to controller 140.

In step 230, the measured pressure $P_v$ in vapor space 116 is compared to the required fuel supply pressure $P_{supply}$, which was determined in step 210. If the measured pressure in the vapor space is equal to or higher than the predetermined required fuel supply pressure, fuel is supplied in gaseous state from vapor space 116 in storage vessel 112 through vapor supply line 126 to fuel delivery line 122, which is step 240. If the measured pressure in the vapor space is lower than the predetermined required fuel supply pressure, the controller executes step 250 and activates fuel pump 118 whereby fuel is supplied from liquid space 114 through liquid fuel supply line 123 to fuel delivery line 122.

The temperature of the fuel supplied to fuel delivery line 122 is increased by flowing the fuel through heat exchanger 130. If fuel is supplied from liquid space 114 the heat exchange rate in heat exchanger 130 is increased compared to when the fuel is supplied from vapor space 116 because the temperature of the fuel supplied from the liquid space is slightly lower than the temperature of the fuel supplied in vapor state from the vapor space.

One advantage of the present method over the known methods for delivering fuel in gaseous state to the air intake system of a gaseous fuelled engine is that fuel can be delivered to the engine without relying on the fuel saturation pressure to push the fuel out of the storage vessel.

Figure 4:
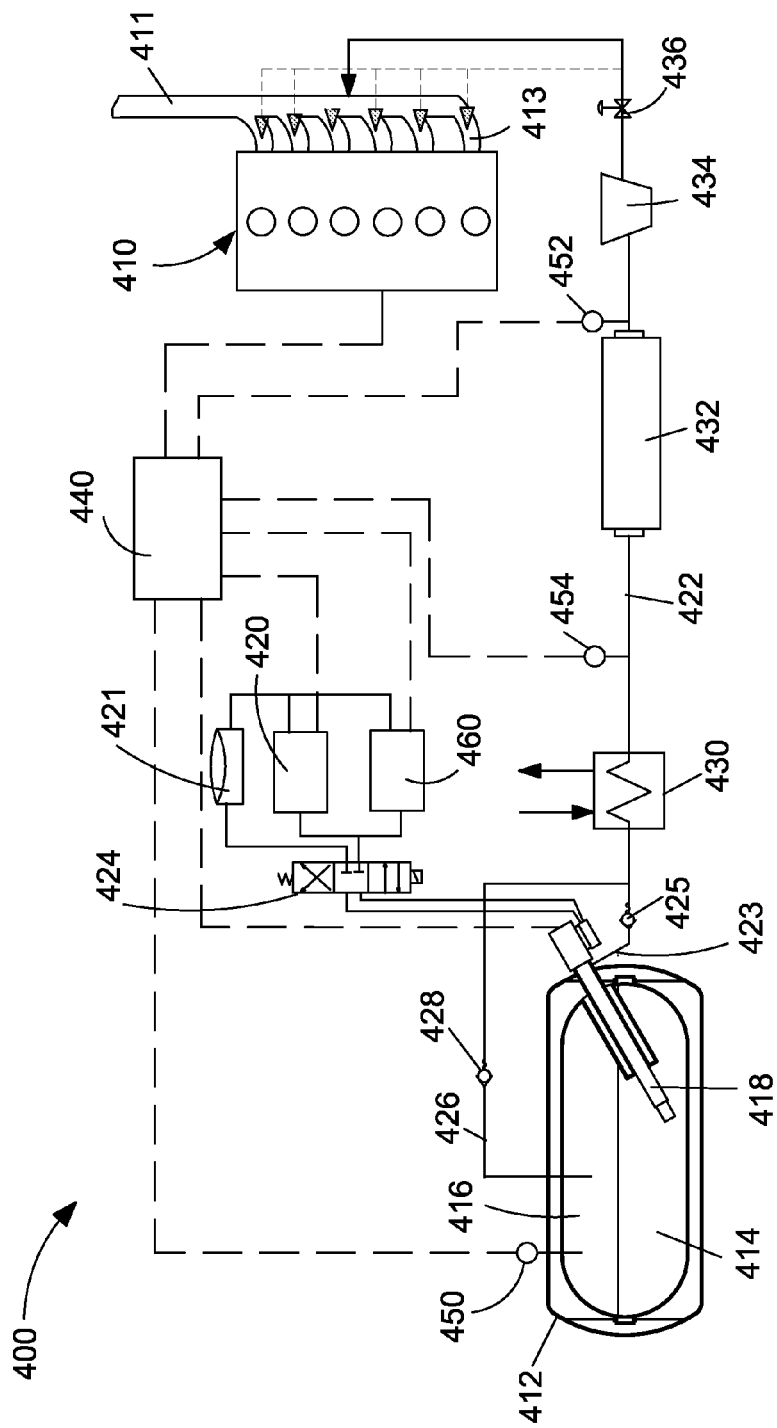
FIG. 4 is schematic diagram of another embodiment of a fuel delivery system comprising two hydraulic pumps for supplying hydraulic fluid to the hydraulic drive unit of the system's fuel pump.
Figure 5:
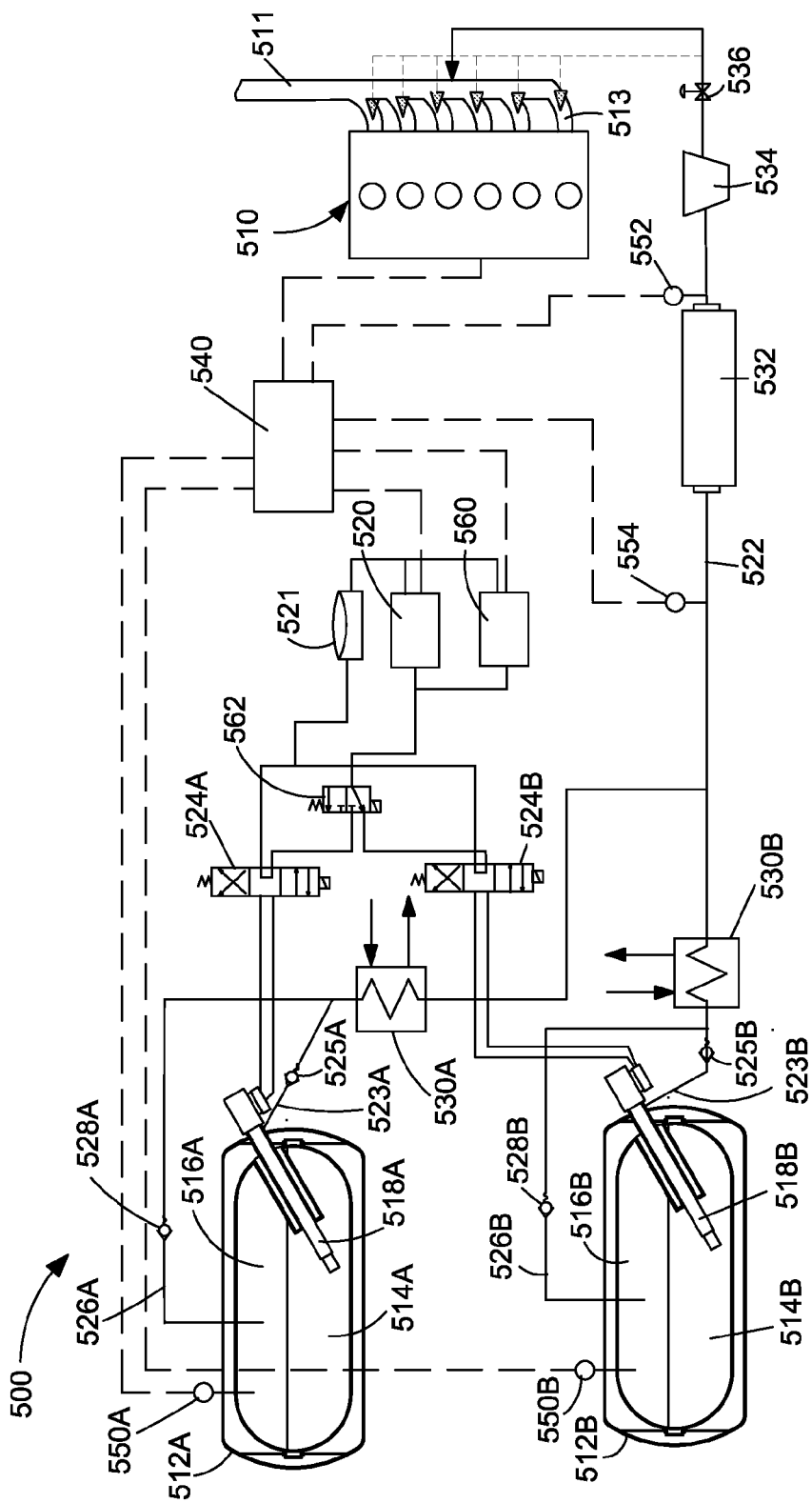
FIG. 5 is a schematic diagram of another embodiment of a fuel delivery system comprising two fuel storage vessels, each storage vessel being associated with a fuel pump, and a controller which activates each of the fuel pumps according to the method described in the present disclosure.
Figure 6:
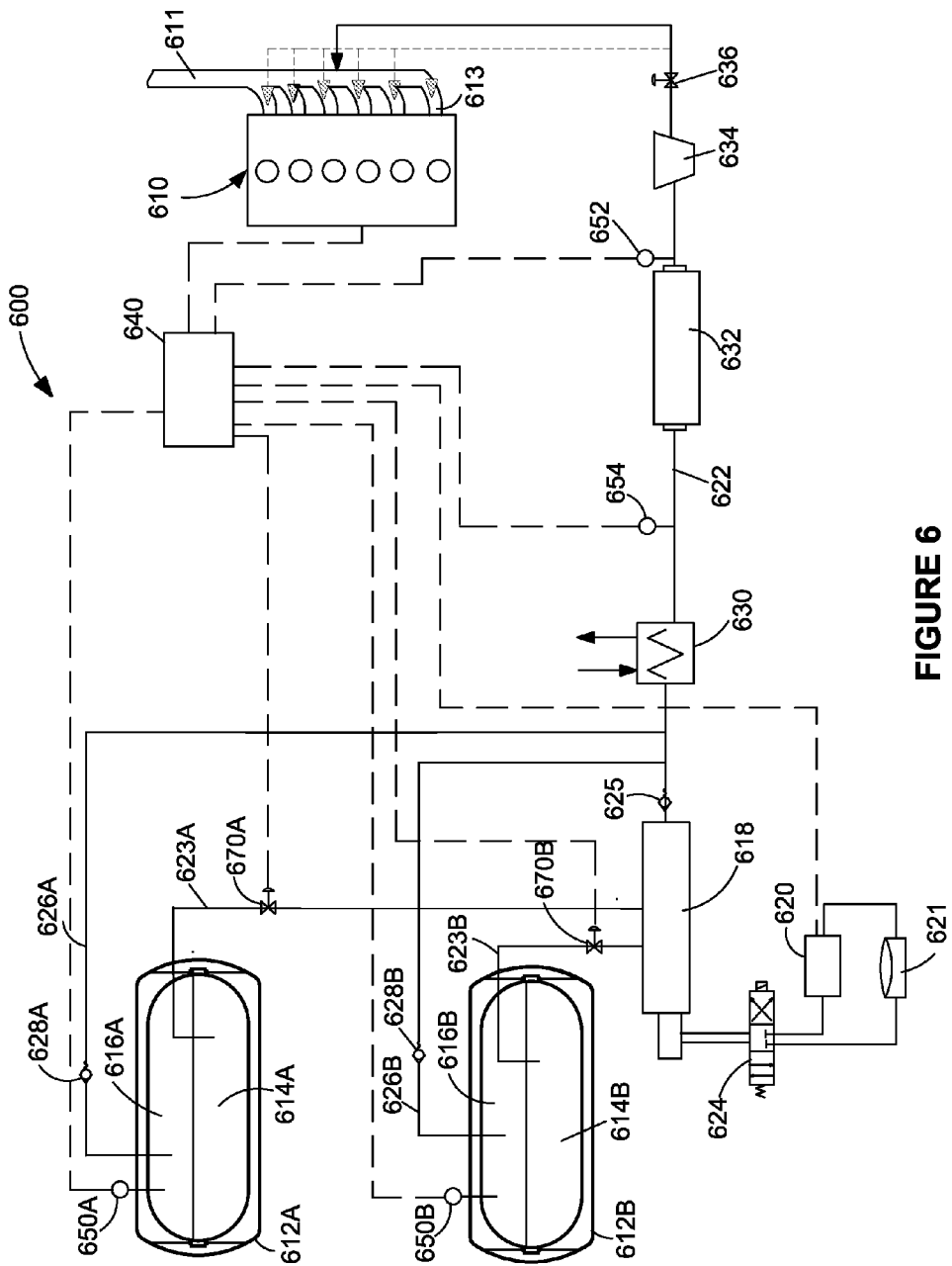
FIG. 6 is a schematic diagram of another embodiment of a fuel delivery system comprising two fuel storage vessels which are both fluidly connected to one external fuel pump and a controller which activates the fuel pump according to the method described in the present disclosure.

Other embodiments of fuel delivery system are illustrated in FIGS. 4 to 6. These embodiments have many components that are equivalent to like components of the embodiment presented in FIG. 1 and like components are identified by like reference numbers. In this disclosure like-numbered components function in substantially the same way in each embodiment. Accordingly, if like components have already been described with respect to one embodiment, while identified in the figures for other embodiments, the purpose and function of like components may not be repeated for each of the illustrated embodiments.

FIG. 4 illustrates another embodiment of a fuel delivery system. Fuel delivery system 400 is delivering fuel in gaseous state from cryogenic storage vessel 412 to air intake manifold 411 or to air intake ports 413 of gaseous fuelled internal combustion engine 410. Fuel can be delivered to fuel delivery line 422 either from vapor space 416 through vapor supply line 426 or it is supplied by fuel pump 418 from liquid space 414 through liquid fuel supply line 423. Liquid supply line 423 and vapor supply line 426 are each provided with check valve 425 and respectively 428 for preventing, or at least reducing, fuel backflow. Fuel passing through fuel delivery line 422 is heated in heat exchanger 430 and the pressure fluctuations in the fuel stream are dampened in module 432. Pressure regulator 434 regulates the fuel pressure to the engine intake pressure. Automatic shut-off valve 436 is provided as a safety measure during the times when the engine is not operating. The pressure in fuel delivery line 422 is measured by pressure sensor 452.

System 400 illustrated in FIG. 4 is different than the system illustrated in FIG. 1 in that it uses two hydraulic pumps 420 and 460 for activating fuel pump 418. Hydraulic pumps 420 and 460 supply hydraulic fluid from storage vessel 421 through flow switching unit 424 to the hydraulic drive unit that drives fuel pump 418. In this arrangement, both hydraulic fluid pumps can be used at the same time when the hydraulic fluid flow rate commanded by controller 440 is higher than that which can be supplied by only one hydraulic pump.

In this embodiment heat exchanger 430 is not commanded by controller 440 and provides the same amount of heat to the fuel flowing through delivery line 422 independently of where the fuel is supplied from. The temperature of the fuel flowing through fuel delivery line 422 is measured by temperature sensor 454 and communicated to controller 440.

The method of delivering fuel from storage vessel 412 to engine 410 is the same as the method described in relation to FIG. 2 and therefore it will not be described here in great detail. The pressure in vapor space 416 is measured by pressure sensor 450 and it is compared to the required fuel supply pressure. If the pressure measured in vapor space 416 is equal to or higher than the required fuel supply pressure fuel is supplied in gaseous state from vapor space 416 to the engine, and if the pressure measured in vapor space 416 is lower than the required fuel supply pressure, fuel pump 418 is activated and fuel is delivered by the pump from liquid space 414 to the engine. The required fuel supply pressure is determined following the same algorithm as the one applied for the system illustrated in FIG. 1.

FIG. 5 illustrates another embodiment of the present fuel delivery system. Fuel delivery system 500 is delivering fuel in gaseous state to air intake manifold 511 or to air intake ports 513 of gaseous fuelled internal combustion engine 510. Fuel system 500 is different than the previous embodiments because it comprises two cryogenic storage vessels 512A and 512B, each storage vessel having respective vapor space 516A and 516B, and respective liquid space 514A and 514B, and being fluidly connected to respective fuel pump 518A and 518B.

Each of the two fuel pumps 518A or 518B is activated by supplying hydraulic fluid from hydraulic storage vessel 521 through one of two hydraulic pumps 520 or 560 or through both of them, through flow switching units 562, and further through one of flow switching units 524A or 524B, to the hydraulic drive unit of the respective fuel pump to be activated. Hydraulic fluid pumps 520 and 560 are driven by an electric motor and therefore can be operated independently from the operation of the internal combustion engine.

Similar to the other embodiments described here, pressure in fuel delivery line 522 is measured by pressure sensor 552 upstream of pressure regulator 534 and downstream of module 532. Pressure fluctuations in fuel delivery line 522 are dampened in module 532. Temperature in fuel delivery line 522 is measured by temperature sensor 554. Automatic shut-off valve 536 is provided as a safety measure on fuel delivery line 522 during the times when the engine is not operating.

A similar method of delivering fuel to the engine as described in relation to FIGS. 1 and 4 is applied here. The pressure in the vapor space of each tank 512A and 512B is measured by respective pressure sensor 550A and 550B and communicated to controller 540. Controller 540 compares the pressure measured in each vapor space with the required fuel supply pressure which is determined in a similar way as in the methods described in relation to FIGS. 1 and 4 and fuel is supplied from a vapor space of one of storage vessels 512A or 512B in which vapor pressure is higher than the required fuel supply pressure. Fuel is supplied from the respective vapor space through vapor liquid line 526A or 526B and through heat exchanger 530A or 530B to delivery line 522. When none of two storage vessels has a vapor pressure higher than the required fuel supply pressure, controller 540 selects and activates one of two fuel pumps 518A and 518B to supply fuel from the liquid space of the storage vessel associated with the activated pump. Liquid fuel is supplied through respective liquid supply line 523A or 523B and through heat exchanger 530A or respectively 530B to delivery line 522. Liquid fuel supply lines 523A and 523B and vapor supply lines 526A and 526B are each provided with check valve 525A, 525B and respectively 528A, 528B to prevent, or at least reduce backflow.

In FIG. 5 controller 540 selects which one of the two fuel pumps should be activated such that the two fuel pumps are operated in sequential order. Alternatively, the amount of fuel remaining in each storage vessel 512A and 512B is measured and controller 540 selects one of fuel pumps 518A or 518B based on which storage vessel has the most fuel.

Even though only two storage vessels are shown in the embodiment illustrated in FIG. 5, the system can comprise more than two cryogenic storage vessels and the method of selecting and activating one fuel pump for supplying fuel from a liquid space of one storage vessel will be similar to the method described above.

FIG. 6 illustrates another fuel delivery system 600 for delivering fuel in gaseous state to air intake manifold 611 or to air intake ports 613 of gaseous fuelled internal combustion engine 610. Fuel system 600 is different than the previous embodiments because it comprises one external fuel pump 618 and two cryogenic storage vessels 612A and 612B whereby fuel pump 618 can supply fuel from liquid space 614A or 614B of the respective storage vessels 612A and 612B. Fuel pump 618 is activated when hydraulic pump 620 supplies hydraulic fluid from storage vessel 621 to the hydraulic drive unit of fuel pump 618 through flow switching unit 624.

Similar to the other embodiments described here, pressure in fuel delivery line 622 is measured by pressure sensor 652 upstream of pressure regulator 634 and downstream of module 632. Pressure fluctuations in fuel delivery line 622 are dampened in module 632. Automatic shut-off valve 636 is provided as a safety measure on fuel delivery line 622 during the times when the engine is not operating. Vapor supply lines 626A and 626B are each provided with check valve 628A and 628B respectively and check valve 625 is provided on delivery line 622 downstream of fuel pump 618 to prevent, or at least reduce, fluid backflow.

A similar method of delivering fuel to the engine as described in relation to FIGS. 1, 4 and 5 is applied in FIG. 6. Pressure in vapor spaces 616A and 616B of each storage vessel 612A and respectively 612B is measured by respective pressure sensor 650A and 650B and communicated to controller 640. Controller 640 compares the pressure measured in each vapor space with the required fuel supply pressure which is calculated in a similar way as in the methods described in relation to FIGS. 1, 4 and 5 and fuel is supplied from a vapor space of one of storage vessels 612A or 612B in which vapor pressure is higher than the required fuel supply pressure. Fuel is supplied from the respective vapor space through vapor liquid line 626A or 626B and through heat exchanger 630 to delivery line 622. When none of the two storage vessels has a vapor pressure higher than the required fuel supply pressure, controller 640 activates fuel pump 618 to supply fuel from the liquid space of one of the two storage vessels 612A or 612B. Fuel is supplied from liquid space 614A or 614B through respective liquid supply line 623A or 623B to delivery line 622.

In this embodiment each liquid supply line 623A and 623B is provided with shut-off valve 670A and 670B respectively which can be commanded by controller 640. When none of the two storage vessels has a vapor pressure higher than the required fuel supply pressure, the amount of fuel in each storage vessel is measured and fuel is supplied from the storage vessel which has the most fuel. For example, when it is determined that storage vessel 612A has the most fuel, controller 640 commands shut-off valve 670B to close and fuel pump 618 supplies fuel from liquid space 614A to delivery line 622. Alternatively if it is determined that storage vessel 612B has the most fuel controller 640 commands shut-off valve 670A to close and fuel pump 618 supplies fuel from liquid space 614B to delivery line 622.

The pressure measurements in this embodiment are communicated by pressure sensors 652, 650A and 650B to controller 640 and the temperature of the fuel flowing through delivery line 622 is measured by temperature sensor 654.

In this embodiment, the required fuel supply pressure is determined following the same logic as the one applied for the systems illustrated in FIGS. 1, 4 and 5.

Even though two storage vessels are shown in FIG. 6, the system can comprise more than two cryogenic storage vessels and the method of selecting the liquid space from which fuel is supplied when none of the storage vessels has a vapor space higher than the required fuel supply system is similar to the one described above.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for delivering a fuel in a gaseous state into an air intake system of a gaseous fuelled internal combustion engine, said method comprising:
   determining a required fuel supply pressure for delivering said fuel into said air intake system according to a required engine intake pressure as a function of an operating condition of said engine;
   measuring pressure in a vapor space of a storage vessel which stores said fuel;
   comparing said measured pressure to said required fuel supply pressure, and
   supplying said fuel in said gaseous state from said vapor space in said storage vessel when said measured pressure is equal to or higher than said required fuel supply pressure, or
   activating a fuel pump and delivering fuel from a liquid space in said storage vessel when said measured pressure is lower than said required fuel supply pressure.

2. The method of claim 1 wherein determining said required fuel supply pressure further comprises adding a predetermined pressure threshold to said required engine intake pressure.

3. The method of claim 2 further comprising determining said predetermined pressure threshold as a function of said engine operating condition.

4. The method of claim 1 wherein the step of activating said fuel pump comprises supplying hydraulic fluid from a hydraulic pump to a hydraulic drive unit that drives said fuel pump.

5. The method of claim 4 wherein said hydraulic pump is driven by an electric motor operating independently from operation of said internal combustion engine.

6. The method of claim 4 wherein said hydraulic pump is a first one of at least two hydraulic pumps, the method further comprising electrically activating at least one additional hydraulic pump to deliver hydraulic fluid to said hydraulic drive unit when a commanded hydraulic fluid flow rate is higher than that which can be supplied by said first one of at least two hydraulic pumps.

7. The method of claim 1 further comprising increasing the temperature of said fuel by flowing it through a heat exchanger.

8. The method of claim 7 further comprising increasing heat exchange rate in said heat exchanger when said fuel is supplied from said liquid space, compared to when said fuel is supplied from said vapor space.

9. The method of claim 1 wherein said storage vessel is a first one of a plurality of storage vessels each having a respective vapor space and a liquid space, said method further comprising:
   measuring pressure in said vapor space of each one of said plurality of storage vessels;
   comparing measured pressure in said vapor space of each one of said plurality of storage vessels with said required fuel supply pressure;
   supplying said fuel from said vapor space of any one of said plurality of storage vessels in which vapor pressure is higher than said required system fuel supply pressure; or
   activating said fuel pump and supplying said fuel from one of said plurality of storage vessels when none of said plurality of storage vessels has a vapor pressure higher than said required system fuel supply pressure.

10. The method of claim 9, said method further comprising measuring the amount of fuel in each of said plurality of storage vessels and, when activating said fuel pump, supplying said fuel from one of said plurality of storage vessels that has the most of said fuel.

11. The method of claim 1 wherein said storage vessel is a first one of a plurality of storage vessels each having a respective vapor space and liquid space, and each having a respective fuel pump, said method further comprising:
   measuring pressure in said vapor space of each one of said plurality of storage vessels;
   comparing measured pressure in said vapor space of each one of said plurality of storage vessels with said required fuel supply pressure;
   supplying said fuel from said vapor space of any one of said plurality of storage vessels in which vapor pressure is higher than said required system fuel supply pressure; or
   selecting and activating one of said fuel pumps and supplying said fuel from an associated one of said plurality of storage vessels when none of said plurality of storage vessels has a vapor pressure higher than said required system fuel supply pressure.

12. The method of claim 11 wherein selecting one of said fuel pumps that is to be activated is determined by operating each one of said fuel pumps in sequential order.

13. The method of claim 11 wherein selecting one of said fuel pumps that is to be activated is determined by measuring the amount of fuel in each one of said plurality of storage vessels and selecting the one of said plurality of fuel pumps that is associated with the storage vessel that has the most of said fuel.

14. The method of claim 11 further comprising increasing the temperature of said fuel by flowing it through a heat exchanger associated with a respective storage vessel from which fuel is supplied to said engine.

15. A system for delivering a fuel in a gaseous state into an air intake system of a gaseous fuelled internal combustion engine, said system comprising:
   a. a storage vessel for holding said fuel;
   b. a fuel pump fluidly connected to receive fuel from a liquid space of said storage vessel;

c. a liquid supply line in fluid communication with a discharge outlet of said fuel pump for delivering fuel from said discharge outlet of said fuel pump to a delivery line which delivers fuel to said air intake system of said engine;

d. a vapor supply line in fluid communication with a vapor space of said storage vessel for delivering fuel in a gaseous state from said vapor space to said delivery line;

e. a pressure sensor for measuring vapor pressure in said vapor space of said storage vessel; and f. a controller which receives pressure measurements from said pressure sensor, determines a required fuel supply pressure for delivering said fuel into said air intake system according to a required engine intake pressure as a function of an operating condition of said engine and compares said measured pressure to said required fuel supply pressure, wherein said controller commands said fuel pump to operate when said measured pressure is lower than said required fuel supply pressure.

16. The system of claim 15 further comprising a heat exchanger placed in said delivery line for increasing the temperature of said fuel being supplied to said engine.

17. The system of claim 15 further comprising a hydraulic pump which supplies hydraulic fluid to a hydraulic drive unit that drives said fuel pump.

18. The system of claim 17 wherein said hydraulic pump is driven by an electric motor operating independently from operation of said engine.

19. The system of claim 17 wherein said hydraulic pump is a first one of at least two hydraulic pumps which can be electrically activated to deliver hydraulic fluid to said hydraulic drive unit that drives said fuel pump.

20. The system of claim 17 wherein said fuel pump is disposed within a cryogenic space of said storage vessel.

21. The system of claim 17 wherein said engine is the prime mover for a vehicle.

22. The system of claim 17 wherein said storage vessel is a first one of a plurality of storage vessels each having a respective vapor space and a liquid space, and being fluidly connected to said fuel pump, and wherein said controller is programmed to activate said fuel pump to supply fuel from said liquid space of one of said plurality of storage vessels when none of said plurality of storage vessels has a vapor pressure higher than said required fuel supply pressure.

23. The system of claim 17 wherein said storage vessel is a first one of a plurality of storage vessels each having a respective vapor space and a liquid space, and each being fluidly connected to a respective fuel pump, and wherein said controller is programmed to select and activate one of said fuel pumps and supply fuel from one of said plurality of storage vessels which is associated with said activated fuel pump when none of said plurality of storage vessels has a vapor pressure higher than said required fuel supply pressure.

* * * * *